United States Patent
Blatt et al.

[11] Patent Number: 5,222,854
[45] Date of Patent: Jun. 29, 1993

[54] AUTOMATIC TOOL CHANGER

[75] Inventors: Leland D. Blatt, 21 Carrington Pl., Grosse Pointe Farms, Mich. 48236; David J. Crorey, Utica, Mich.

[73] Assignee: Leland D. Blatt, Grosse Pointe Farms, Mich.

[21] Appl. No.: 756,492

[22] Filed: Sep. 9, 1991

[51] Int. Cl.5 ............................. B65G 35/00
[52] U.S. Cl. ..................... 414/225; 414/917; 414/737; 414/749; 901/30
[58] Field of Search ........... 414/749, 225, 737, 917; 901/30, 40, 46; 212/177; 29/568; 100/207; 72/405

[56] References Cited

U.S. PATENT DOCUMENTS

| | | | |
|---|---|---|---|
| 3,179,262 | 4/1965 | Carlson, Sr. et al. | 100/207 X |
| 4,193,731 | 3/1980 | Blatt et al. | 414/589 |
| 4,378,592 | 3/1983 | Heiberger et al. | 100/207 X |
| 4,475,863 | 10/1984 | Blatt et al. | 414/589 |
| 4,585,389 | 4/1986 | Watanabe et al. | 414/225 X |
| 4,589,819 | 5/1986 | Shirao | 414/225 X |
| 4,604,787 | 8/1986 | Silvers, Jr. | 901/30 X |
| 4,828,306 | 5/1989 | Blatt | 294/64.2 |
| 4,898,287 | 2/1990 | Blatt | 212/177 |
| 4,905,850 | 3/1990 | Blatt | 212/177 |
| 4,941,793 | 7/1990 | Shiraishi et al. | 414/225 |
| 4,988,261 | 1/1991 | Blatt | 414/749 |
| 5,044,063 | 9/1991 | Voellmer | 901/30 X |

FOREIGN PATENT DOCUMENTS

| | | | |
|---|---|---|---|
| 0110045 | 6/1984 | European Pat. Off. | 901/30 |
| 2211170 | 6/1989 | United Kingdom | 901/30 |

*Primary Examiner*—Michael S. Huppert
*Assistant Examiner*—William M. Hienz
*Attorney, Agent, or Firm*—Basile and Hanlon

[57] ABSTRACT

A production line which includes a shuttle conveyor extending between two work stations. A first transfer device for transferring a workpiece from one of the work stations to the conveyor and a second transfer device for transferring the workpiece to the second work station all equipped with workpiece gripping or supporting devices which may be rapidly changed when the line is shifted from the production of one form of workpiece to the production of another workpiece having a different configuration. Replacement workpiece gripping devices are supported adjacent the shuttle conveyor upon holding pedestals. Upon line changeover, the transfer devices locate their workpiece gripping devices upon empty holding pedestals and actuating devices on the pedestal release the gripping devices from their transfer devices. The empty transfer devices are then shifted and coupled to new workpiece gripping devices supported on other holding pedestals.

14 Claims, 7 Drawing Sheets

AUTOMATIC TOOL CHANGER

BACKGROUND OF THE INVENTION

The present invention is directed to an automatic tool changer primarily intended for use with workpiece handling apparatus employed to transfer sheet metal panels from one work station to the next in a production line where the line is changed over from time to time from producing panels of one configuration to producing panels of a different configuration.

Sheet metal automobile body panels are typically formed by passing the sheet metal blank through a series of stamping dies which progressively transform the original flat rectangular sheet metal blank into the desired final panel configuration. The presses in which the dies are mounted are massive machines. The capital investment required to set up a single stamping production line is such that the line cannot be dedicated to the production of only a single type of panel. Conversion of the line from the production of one type of body panel to another requires not only the changing of the dies in the various presses, but also will require, for reasons to be explained below, changes to panel gripping and handling devices employed to transfer the panels from one press to the next.

In the past, the standard practice was to operate the line on relatively long production runs—that is to produce a relatively large number of panels of one type before changing the line over to produce panels of a different type. This procedure required a substantial amount of storage space to store the panels. A production run on the stamping line might, for example, produce enough panels to supply the assembly line for ten days. The rate at which the panels could be produced by the stamping line was substantially higher than the rate at which the panels were required at the assembly line, hence the time constraints on changing the line over from one panel to another were quite generous.

At present, however, the preferred procedure is the so-called "just in time" production system in which the storing of large numbers of panels in inventory is substantially eliminated. Practice of the "just in time" procedure dictates relatively short production runs with rapid changeover of the stamping line from one panel to another being required.

As noted above, the changeover of the stamping line from the production of one type of panel to the production of a different panel requires not only the changing of the dies in the presses, but also almost invariably requires the changing of the panel engaging elements of the article handling system employed to transfer the panels from one press to the next.

Typically, the panels are moved into and out of the presses by a group of vacuum cups mounted upon a frame to grip the upper surface of a generally horizontally disposed panel to stably support the panel so that it can be lifted by the frame from one location, transported horizontally and then lowered and released at another location. Because the size and configuration of the panels can vary considerably from one type of panel to another, the number and location of the vacuum cups on their carrying frame must be conformed to the shape of the particular panel which is to be handled. Typically, the distance between adjacent presses is such that a handling device employed to manipulate the vacuum cup carrying frame to extract a panel from one press cannot conveniently be employed to load the extracted panel into the next press. The most common arrangement finds a vacuum cup carrying frame being manipulated by a take-out device to extract the panel from the first press and to load the panel upon a panel receiving "nest" on a transfer conveyor which then conveys the panel to a location adjacent the next press where a second vacuum cup carrying frame is manipulated by a loading device to remove the panel from the transfer conveyor nest and load it into the second press.

In this system, three panel supporting devices are required—two vacuum cup carrying frames, one for each of the take-out and loading devices, and a third panel supporting device or nest for supporting the panel upon the transfer conveyor.

The present invention is especially directed to systems which enable a rapid and largely automated change of the panel engaging devices of such a transfer system.

SUMMARY OF THE INVENTION

For purposes of explanation, it will be assumed that the workpiece handling apparatus of the present invention is employed in a stamping plant to transfer sheet metal automotive body panels from one stamping press to the next. A shuttle conveyor extends from a panel receiving end located adjacent the first press to a panel discharge end located adjacent the second press. A first workpiece transfer device is located adjacent the first press and manipulates a vacuum cup carrying frame to extract a workpiece panel from the first press and to load the extracted panel on a panel carrying nest on a shuttle carriage located at the panel receiving end of the shuttle conveyor. The shuttle conveyor then drives the carriage to its opposite panel discharge end, at which a second transfer device manipulates a vacuum cup carrying frame to lift the workpiece panel from the shuttle carriage nest and load the workpiece into the second press.

The present invention is especially directed to converting or changing over such a workpiece handling system from handling automotive body panels of one configuration to the handling of automotive body panels of another configuration—i.e., from the production of rear quarter panels to the production of door panels, for example. In addition to the changing over of the dies within the stamping presses, the workpiece handling system must be provided with new vacuum cup carrying frames conformed to the new panel and a new workpiece carrying nest which is mounted on the shuttle carriage to receive and stably support the panel during its movement along the shuttle conveyor.

The vacuum cup carrying frames consist typically of an elongate main frame member usually provided with one or more branches which carry vacuum cups arranged in a pattern such that the cups can grip and stably support a workpiece panel of a particular configuration. The present invention enables an automatically and quickly performed mounting or dismounting of a vacuum cup carrying frame upon a carrier boom of a transfer device, and thus in accordance with the present invention, separate vacuum cup carrying frames are utilized, each separate frame being dedicated to one particular type of body panel.

The vacuum cup carrying frame and the carrier boom of the transfer device are constructed with a quick disconnect coupling assembly of the type disclosed in U.S. Pat. Nos. 4,898,287 and 4,905,850. This particular type of coupling finds a pair of hollow tubular pins on one member being slidably and sealingly received in tubular bores in the other. A rotatable locking member extending transversely of one of the bores can be rotated into a recess in one of the pins of the other member to mechanically lock the two members to each other while establishing pneumatic connections for supplying vacuum inducing air to the vacuum cups carried on the cup carrying frame through the tubular pins.

To enable to an automatic mounting of a vacuum cup carrying frame upon the carrier boom of one of the transfer devices, a frame holding pedestal is mounted at a location spaced to one side of the shuttle conveyor At the upper end of the pedestal, a support platform having a pair of vertically projecting locating pins is arranged to locate and support the central frame member of the vacuum cup carrying frame, with the two locating pins projecting upwardly into pin receiving recesses on the frame member. This arrangement stably supports the frame against horizontal movement upon the top of the holding pedestal, while allowing the frame to be easily removed simply by lifting it vertically upwardly to disengage the frame from the pins.

The frame member of the vacuum cup carrying frame carries the tubular pins of the quick disconnect coupling, and the locating pins which project vertically upwardly from the support platform lie in a vertical plane which is parallel to the horizontally disposed longitudinal axes of the tubular pins on the vacuum cup carrying frame member. The carrier boom is formed with the tubular pin receiving bores and carries the rotatable locking member. The empty carrier boom is simply driven in horizontal movement by its transfer device to seat the tubular pins on the vacuum cup carrying frame in the bores in the carrier boom. At this time, a power driven lock actuator on the support platform of the holding pedestal is driven axially into engagement with the rotary locking member on the carrier boom and then rotated to mechanically lock the vacuum cup carrying frame to the carrier boom. The boom is then raised vertically to lift the carrier frame off the locating pins on the support platform. Dismounting of a vacuum cup carrying frame from the boom is accomplished by a reversal of the foregoing procedure.

The vacuum cup carrying frames have the vacuum cups located to grip a generally horizontally disposed workpiece panel from above. The panel is lifted from the die at the working station, horizontally transferred to a position overlying the shuttle conveyor carriage nest and then lowered and dropped into the nest detachably mounted on the shuttle conveyor carriage. The nest is conformed to receive and stably support the workpiece panel—the panel simply rests upon or within the nest and no mechanically or pneumatically actuated gripping devices are required. The nest may be readily mounted or dismounted from the shuttle carriage by a simple manually actuated mechanical quick disconnect coupling on the shuttle carriage.

Various arrangements of the major components of the system may be utilized. In one arrangement, a single shuttle conveyor is permanently located to extend between the two presses and one or more holding pedestals are located at positions horizontally spaced from the conveyor. The carrier boom of each transfer device is mounted on a transfer device frame for movement within a vertical general plane relative to the transfer device frame while the frame is mounted for horizontal movement relative to the stationary press. The boom may be moved horizontally to a vacuum cup frame held upon the holding pedestal and then moved horizontally into operative alignment with the press and shuttle conveyor. In this particular system, usually two or more holding pedestals are employed, one to receive from the carrier boom the vacuum cup carrying frame which is being taken out of service, while the other holding pedestal supports a vacuum cup carrying frame which is to be placed in service.

In another form of system, the carrier booms of the transfer devices operate only in a single, fixed vertical general plane—that is the carrier booms are mounted in a transfer device frame which is stationary and typically mounted directly upon the press frame. In this particular system, two alternatively utilized shuttle conveyors are employed, each conveyor being mounted upon a platform which carries a holding pedestal offset from each of the opposite ends of the shuttle conveyor. The platforms are independently movable in a horizontal direction normal to the general plane of movement of the carrier boom. To change over from the handling of one type of work panel to the handling of another, the platform carrying the shuttle conveyor being taken out of service is shifted to align the holding pedestal on that platform with the vertical plane of movement of the carrier boom which then lowers its vacuum cup carrying frame onto the holding pedestal. The lock actuator on that holding pedestal is then actuated to disengage the rotary locking member and the carrier is then withdrawn from the vacuum cup carrying frame being taken out of service. The platform carrying this last holding device and its associated shuttle conveyor is then moved clear of the presses and the platform carrying the other conveyor and holding device is moved into a position in which its holding device and a vacuum cup carrying frame supported upon the holding device is aligned with the carrier boom of the transfer device. The boom is then moved into engagement with the vacuum cup carrying frame, the locking device on the holding pedestal is actuated to mechanically lock the frame to the carrier boom, and the carrier boom is then elevated to lift the vacuum cup frame clear of its holding pedestal. The underlying platform is then shifted again to align the shuttle conveyor being placed into service with the carrier boom and presses.

Other objects and features of the invention will become apparent by reference to the following specification and drawings.

Figure 1:
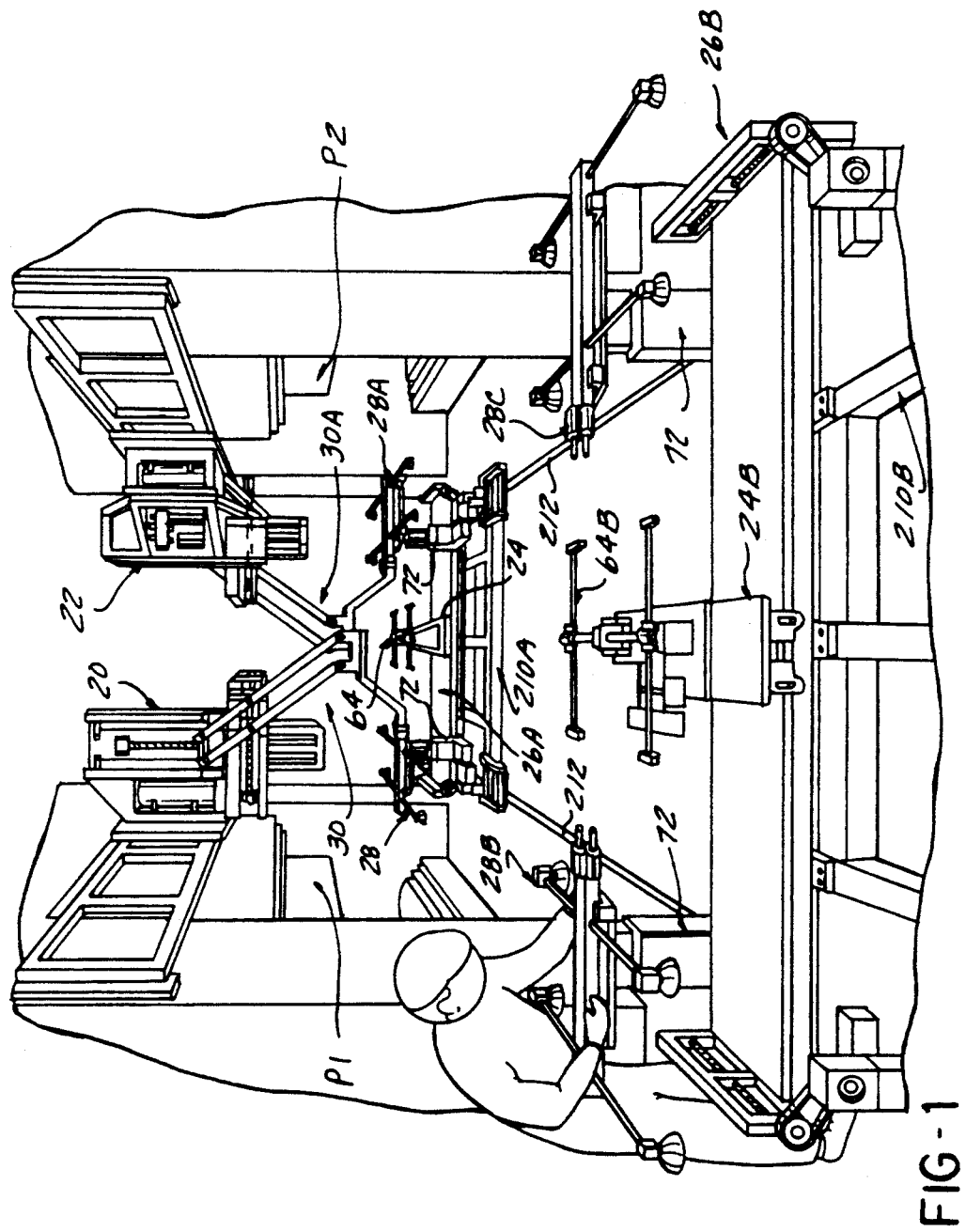
FIG. 1 is a simplified schematic perspective view of one form of workpiece handling apparatus embodying the present invention, with certain parts broken away or omitted.
Figure 3:
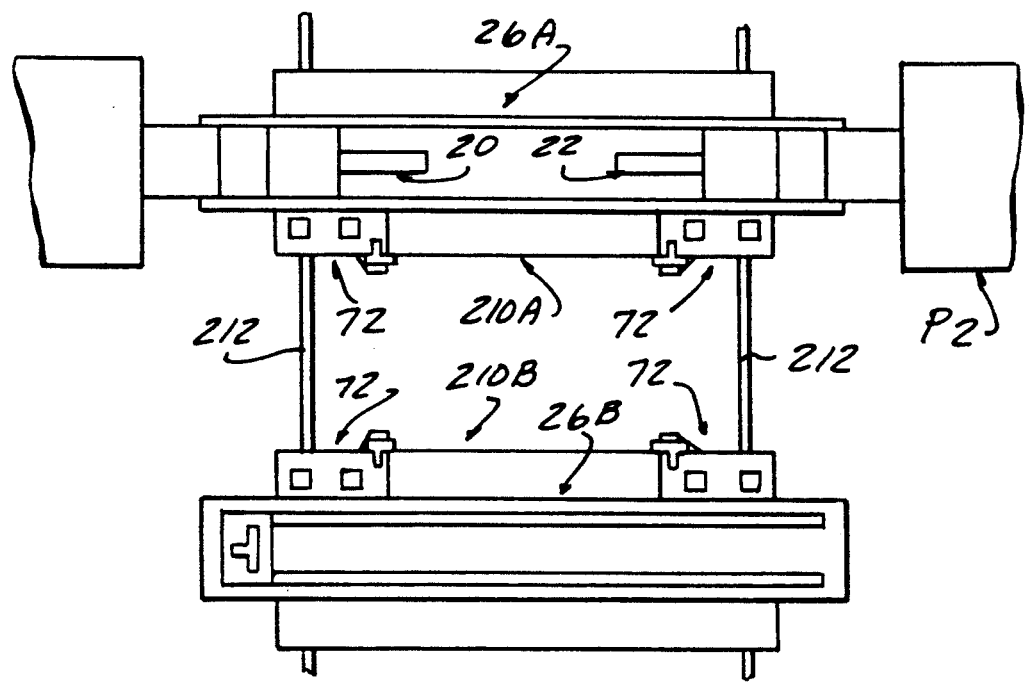
FIG. 3 is a simplified top plan view of the apparatus of FIG. 1.

One form of workpiece handling apparatus embodying the present invention is schematically illustrated in FIGS. 1 and 3 in an application where the apparatus transfers sheet metal workpieces from a first stamping press P1 to a second press P2. The major components of the system include two like press loader/unloader units or transfer devices designated generally 20, 22 which are mounted at fixed positions relative to the respective presses P1 and P2. Transfer devices 20 and 22 are known in the art and are commercially available from ISI Robotics, Fraser, Mich.

Figure 2:
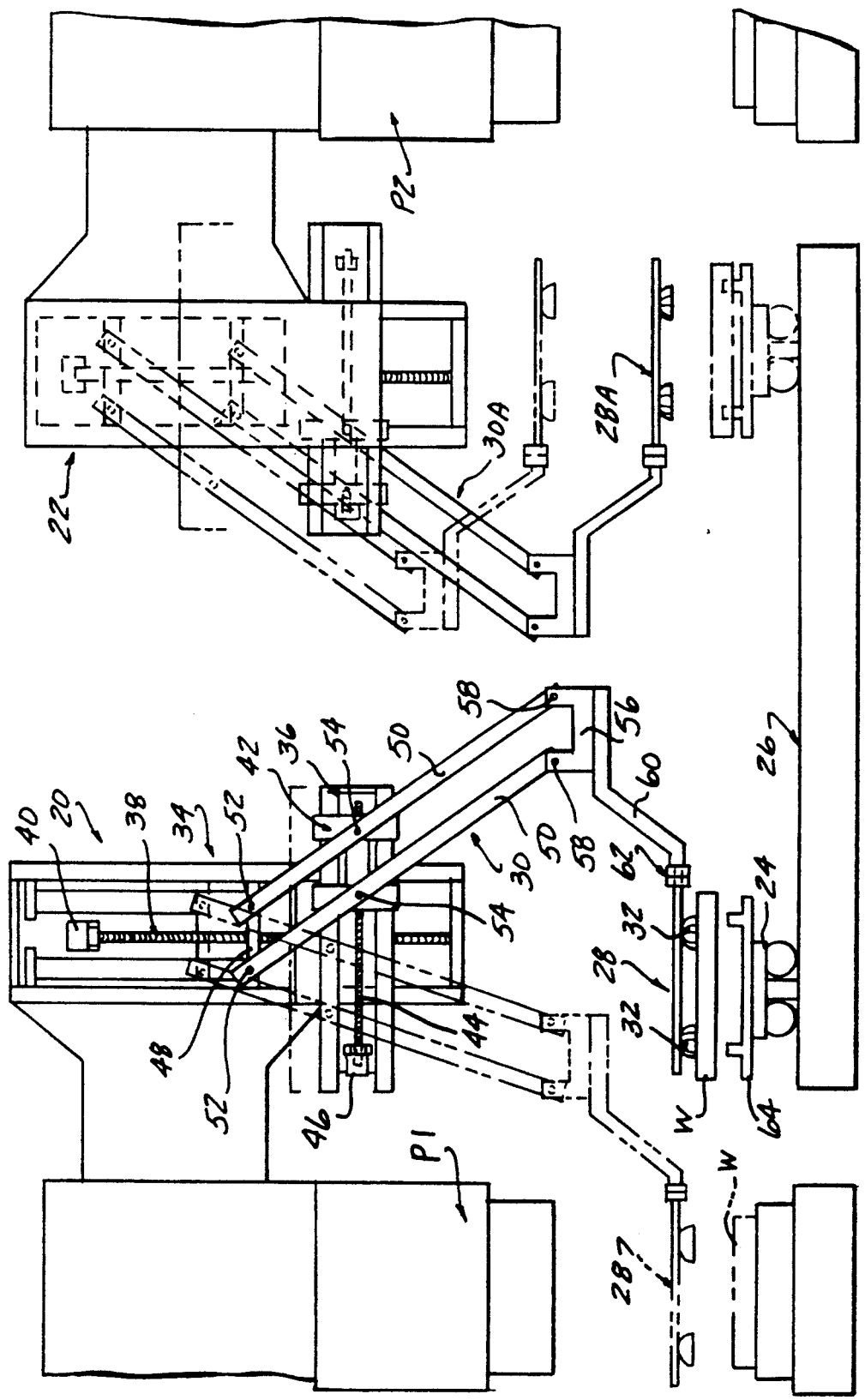
FIG. 2 is a simplified schematic side elevational view of the apparatus of FIG. 1.

As best indicated in FIG. 2, transfer device 20 functions as a press unloader to transfer a workpiece W from press Pl to the shuttle carriage 24 of a shuttle conveyor designated generally 26. In FIG. 2, shuttle carriage 24 is shown in what will be referred to as a receiving position adjacent the left-hand end of conveyor 26 and is about to receive a workpiece W carried by a vacuum cup carrying frame designated generally 28 which is in turn carried by a carrier means in the form of a parallelogram linkage designated generally 30 which constitutes an operating part of the transfer device 20. The workpiece W is held upon frame 28 by vacuum cups 32, of well-known construction, see, for example, U.S. Pat. No. 4,828,306.

Once deposited upon carriage 24 by the release of the vacuum from cup 32, the workpiece W is conveyed by carriage 24 to the opposite or discharge end of shuttle conveyor 26, from which the workpiece W is transferred by a vacuum cup carrying frame 28A carried by a parallelogram linkage 30A of transfer device 22 from shuttle carriage 24 into the opened press P2.

The two transfer devices 20 and 22 are of identical construction, and the following general description of the device 20 is equally applicable to transfer device 22, corresponding reference numerals with the subscript A identifying the parts of device 22. Referring particularly to FIG. 2, transfer device 20 includes a fixed frame 34 which, in the embodiment of FIGS. 1–3, is fixedly mounted upon a fixed framework which may take the form of the frame of the press P1, for example. A vertically movable lift frame 36 is mounted upon fixed frame 34 for guided vertical movement relative to frame 34. A vertical drive or lift screw 38 rotatably mounted on fixed frame 34 is threadably received by a suitable nut means (not shown) mounted on lift frame 36, screw 38 being driven in rotation by a reversible drive motor 40 mounted on fixed frame 34. A slide frame 42 is mounted for horizontal sliding movement upon lift frame 36 under the control of a second drive screw 44 rotatably mounted upon frame 36 and threadably received in a nut means (not shown) in slide frame 42. A reversible drive motor 46 is employed to rotate screw 44.

A horizontal bar 48, constituting a portion of the parallelogram linkage 30, is mounted upon fixed frame 34 for guided vertical movement relative to frame 34. The two main links 50 of parallelogram linkage 30 are pivotally mounted at their upper ends at the opposite ends of bar 48 as by pivots 52. At a location intermediate their ends, links 50 are mounted at horizontally spaced locations on slide 42 as by pivots 54, while the lower ends of links 50 are coupled to a mounting link 56 as by pivots 58. A carrier boom 60 of the type shown in U.S. Pat. Nos. 4,898,287 and 4,905,850 is fixedly mounted to mounting link 56, and the vacuum cup carrying frame 28 is detachably coupled to boom 60 by a quick disconnect coupling designated generally 62. As will be described in greater detail below, coupling 62 includes mating components on boom 60 and on frame 28.

Drive motors 40 and 46 are controlled by a programmable control unit (not shown, but known in the art) which may be programmed to coordinate the operation of drive motors 40 and 46 to cause the vacuum cup carrying frame 28 to move along a preselected path. Operation of drive motor 40 bodily raises or lowers the parallelogram linkage 30 and its attached boom 60 vertically, but does not impart any horizontal motion to boom 60. Operation of the horizontal drive motor 46 shifts pivots 54 of linkage 36 horizontally, and this horizontal motion of pivots 54 induces motion of boom 60 which has both horizontal and vertical components of motion due to the fact that the pivots 58 at the lower ends of main links 50 must move in circular arcs centered on the associated pivot 54. The upper ends of links 50 are constrained against any horizontal movement by the bar 44, which can move freely vertically relative to fixed frame 34 as required by movement of the horizontal slide 42. As stated above, transfer devices 20 and 22 are commercially available devices known in this art.

Similarly, many types of shuttle conveyors 26 suitable for use in systems of this type are commercially available. See, for example, the shuttle conveyor, shuttle carriage and work holder platform described in U.S. Pat. No. 4,988,261, whose disclosure is incorporated by reference. The conveyor 26 includes a drive (not shown) coupled to carriage 24 which is operable to drive carriage 24 in movement between the two end positions indicated in FIG. 2. The workpiece W is supported upon shuttle carriage 24 by a so-called "nest" 64 which is detachably mounted upon the carriage 24 by any suitable mechanical arrangement which will accommodate a reasonably quick manual mounting or dismounting of a nest 64 upon carriage 24. Where the system is set up to handle sheet metal body panels of complex shape, such as that of the body panel BP of FIG. 6, for example, the underside of the body panel may be employed to form a mold for forming a nest for conveying panels of that particular configuration. The panel simply rests upon or in the nest while being transferred on the shuttle conveyor. Because the panel is held in position simply by gravity, it is not necessary to supply air under pressure or electrical power to the nest to actuate holding devices. Hence the mechanical structure for attaching a nest to a carriage 24 may simply take the form of one or more vertical locating pins (not shown) on the nest or carriage received in a vertical locating bore in the carriage or nest with the pin being releasably retained in the bore as by a spring-loaded detent, or releasable latch, or rotary cam lock. For present purposes, it may be assumed that the nest is manually mounted upon or dismounted from carriage 24. See, for example, U.S. Pat. No. 4,988,261 for a disclosure of a shuttle conveyor, shuttle carriage and a work holder platform detachably mounted upon the carriage.

Figure 6:
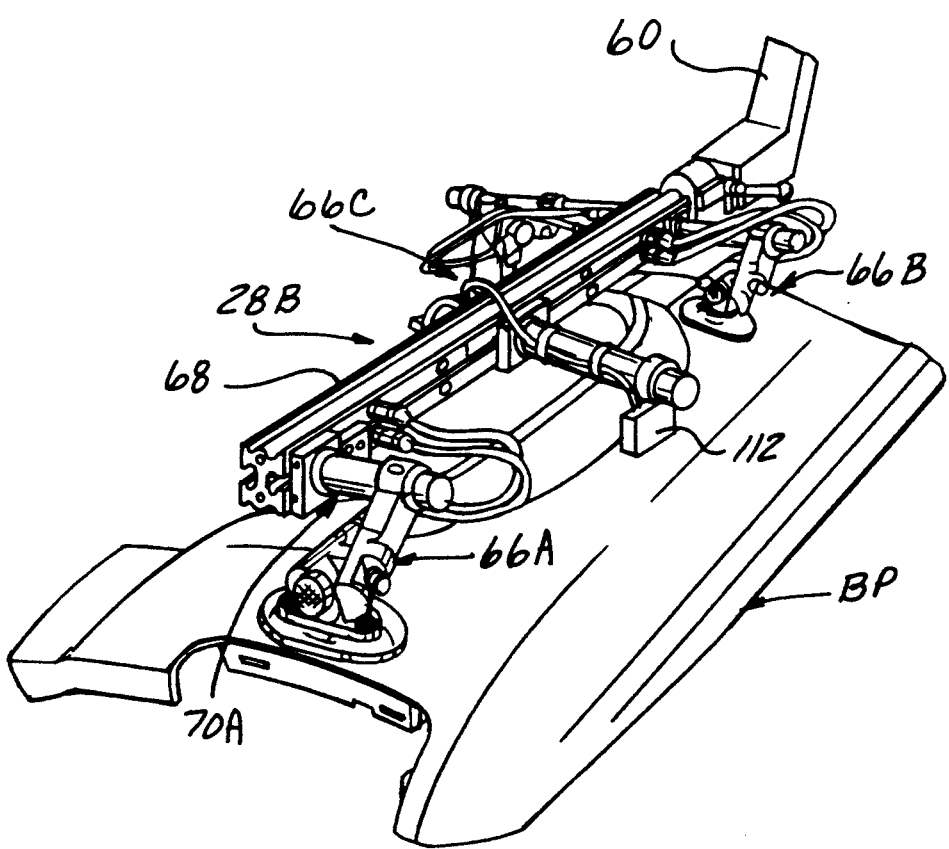
FIG. 6 is a perspective view of a typical vacuum cup carrying frame of the present invention engaged with a typical workpiece panel.

As stated above, present-day practice in the automotive industry is to operate stamping plant production lines to supply body panels to the vehicle assembly line under a "just-in-time" schedule. This results in frequent changeovers of the stamping plant lines from the production of one type of body panel to the production of another, and the present invention is directed to apparatus specially designed to enable the workpiece handling units to be rapidly and efficiently changed over from the handling of one type of body panel to the handling of another. Referring briefly to FIG. 6, the body panel BP there shown is a left rear quarter panel shown being gripped by a vacuum cup carrying frame 28B having three vacuum cup assemblies 66A, 66B, 66C located to grip the panel at three separated points to stably support the panel. Other body panels of different configuration—a right front fender, for example—might require a different number and arrangement of vacuum cups. A nest 64 on the shuttle conveyor carriage conformed to support and fixedly locate the panel BP of FIG. 6 would not support a front fender panel.

In the past, referring to FIG. 6, the vacuum cup assemblies 66A, 66B and 66C have been mounted upon a main frame member 68 by mounting arrangements such as 70A which accommodate a fairly wide range of adjustment of the position of the vacuum cup assembly 66A relative to the main frame member. When the time comes to change the cup carrying frame 28B from conforming to one type of body panel to conforming to another, this adjustment capability of the vacuum cup position has been utilized to relocate the vacuum cups as required, this adjustment being performed while the main frame member 68 remains coupled to the transfer device boom 60.

A more rapid changeover, however, may be accomplished in accordance with the present invention by providing a series of vacuum cup carrying frames, each conformed and dedicated to the handling of a single type of body panel. The quick disconnect devices for coupling any selected one of these vacuum cup frames to the transfer device boom 60 such as those disclosed in U.S. Pat. Nos. 4,898,287 and 4,905,850 present the possibility of accomplishing a rapid automated changeover. In such a changeover, a vacuum cup carrying frame such as 28 or 28B conformed to one type of body panel is automatically dismounted from the transfer device boom 60 and replaced by a different vacuum cup carrying frame conformed to handle a different panel configuration.

Figure 10:
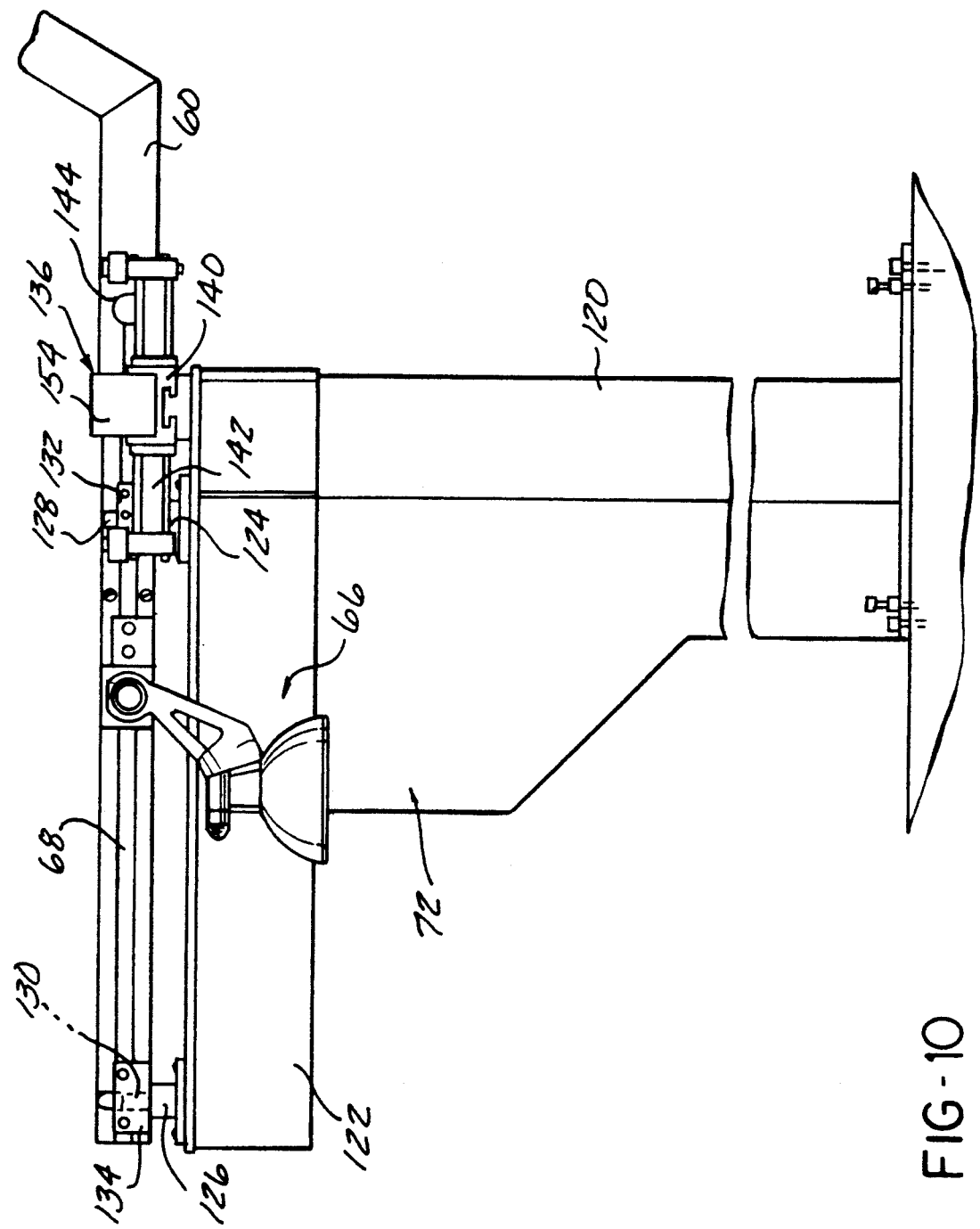
FIG. 10 is a side elevational view of a holding pedestal supporting a vacuum cup carrying frame with certain parts broken away or omitted.
Figure 11:
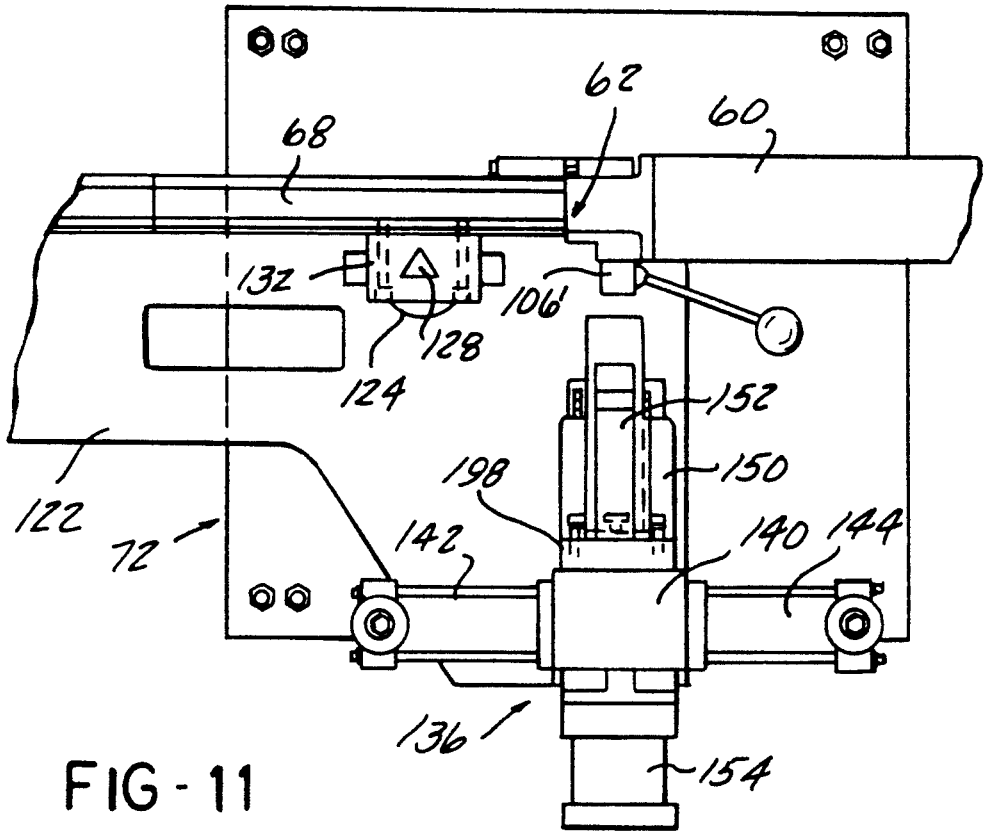
FIG. 11 is a top plan view of the apparatus shown in FIG. 10, again with certain parts broken away or omitted.
Figure 12:
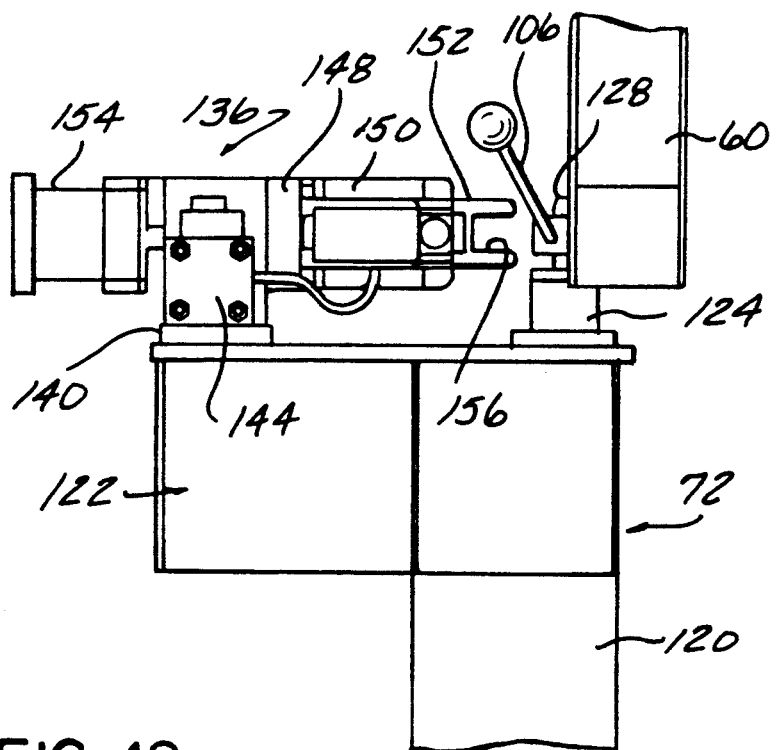
FIG. 12 is a front end view of the structure shown in FIGS. 10 and 11, again with certain parts broken away or omitted.

In order to accomplish this, in addition to the major system components discussed above, a group of holding pedestals 72 (FIG. 3) are employed. The structural details of pedestals 72 are best shown in FIGS. 10-12, and will be described in greater detail below. In general terms, the function of holding a pedestal is to support a vacuum cup carrying frame 28, etc. in a ready position to be coupled to a transfer boom 60 or to receive a vacuum cup carrying frame 28 being taken out of service from the boom 60. The structure, function and operation of the holding pedestals 72 is best understood by first considering the structure of the vacuum cup carrying frames such as schematically indicated at 28, 28A in FIGS. 1 and 2 and shown in somewhat greater structural detail in FIG. 6, with further details of the quick disconnect coupling 62 shown in FIG. 9.

Figure 9:
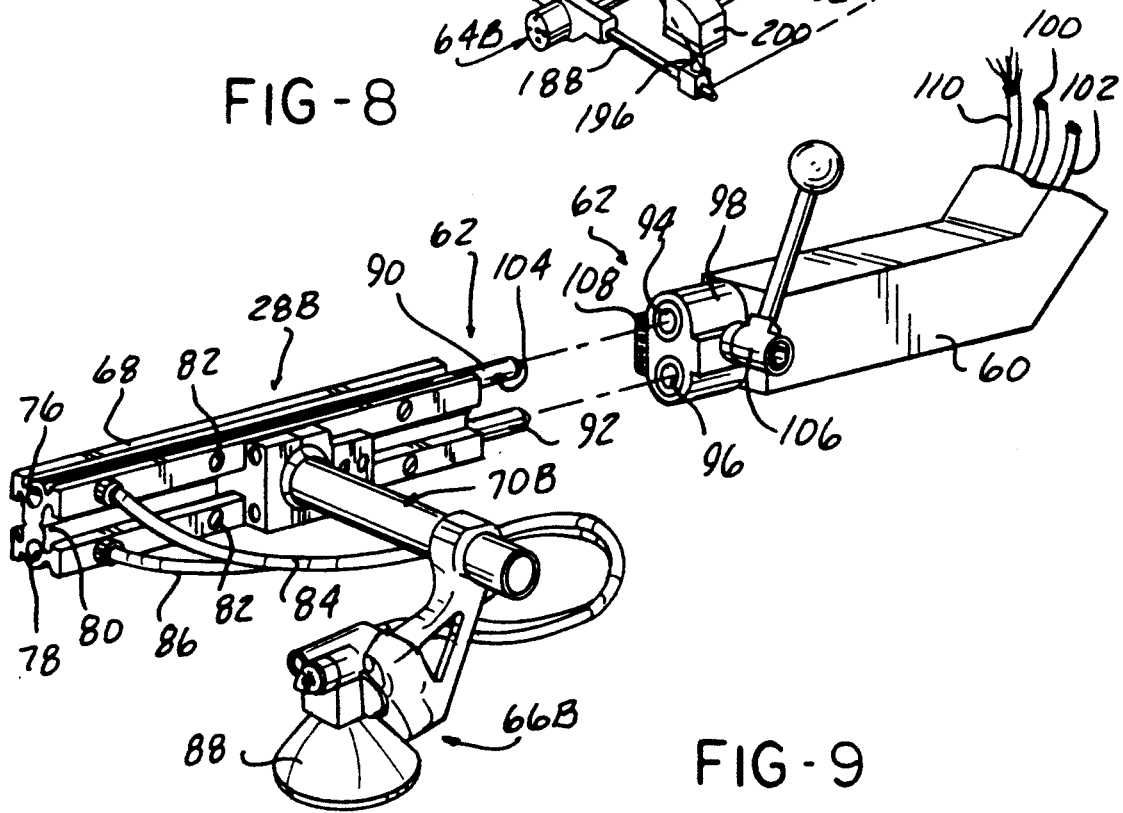
FIG. 9 is a perspective view, with certain parts broken away, showing details of the quick disconnect device employed.

Referring to FIG. 9, a vacuum cup carrying frame such as 28B includes a main frame member 68 which preferably is formed as an aluminum extrusion having a pair of longitudinally extending through passages 76, 78 and longitudinally extending undercut T slots such as 80 formed in both of its opposite sides. At longitudinally spaced positions along main frame member 68, tapped bores 82 extend inwardly from opposite sides of the frame member to open into the bores 76, 78. These tapped bores are normally plugged as by a threaded set screw; by unplugging selected bores and connecting flexible hoses such as 84, 86, the passages 76 and 78 may be placed in fluid communication with a vacuum cup assembly such as 66B. Vacuum cup assembly 66B may, for example, take the form of the vacuum cup, housing and controls disclosed in U.S. Pat. No. 4,828,306, whose disclosure is incorporated herein by reference.

At one end of main frame 68, hollow tubular pins 90, 92 are fixedly and sealingly mounted on the end of frame member 68 to project longitudinally from the frame member, the pins 90 and 92 having longitudinal through passages (not shown) which communicate respectively with the passages 76, 78 in frame member 68. The opposite ends of passages 76, 78 are plugged. Tubular pins 90, 92 are spaced from each other to be slidably and sealingly received within bores 94, 96 formed in a fitting 98 fixedly secured to the end of boom 60. The bores 94, 96 through fitting 98 are in fluid communication with a pair of flexible hoses 100, 102 which may be connected, as shown in U.S. Pat. No. 4,828,306 to a four-way reversing valve to conduct air under pressure to or from the passages 76, 78 in frame member 68. As explained in greater detail in U.S. Pat. Nos. 4,898,287 and 4,905,850, when the tubular pins 90 and 92 on frame member 68 are fully seated in the bores 94, 96 on fitting 98 of boom 60, in addition to functioning as a fluid pressure coupling, pin 90 is formed with a concave recess 104 which cooperates with a cam (not shown) on a rotatable cam member 106 which may be rotated to one position clear of recess 104 so that pins 90 and 92 can be freely inserted into or withdrawn from bores 94, 96 or rotatably positioned in a locking position in which a cam is seated within recess 104 to mechanically lock and prevent the withdrawal of pin 90 from its bore 94. This rotary locking arrangement, as described in greater detail in U.S. Pat. Nos. 4,898,287 and 4,905,850 mechanically locks the vacuum cup carrying frame 28B to boom 60.

As also explained in U.S. Pat. Nos. 4,898,287 and 4,905,850, the fitting 98 on boom 60 may also carry one element 108 of a multi-pin electrical connector which, when pins 90 and 92 are fully seated in bores 94, 96, likewise receives the pins of a mating electrical conductor fixedly mounted on that side of frame member 68 remote from the observer in FIG. 9 to electrically connect the individual electrical wires of a multiconductor electrical cable 110 which passes through boom 60 to be electrically connected to connector element 108. Referring to FIG. 6, a vacuum cup carrying frame such as the frame 28B may carry an electronic proximity sensor such as 112 which transmits an electrical signal via the conductors of cable 110 to the control system of the apparatus to signal that the clamp carrying frame is close enough to a body panel so that the vacuum cups are in contact with the body panel and can be evacuated to grip the panel. The proximity switch 112 will also signal the control circuit that a body panel has in fact been released as the clamping frame moves away from the panel.

In FIGS. 10–12, the main frame member 68 of a clamping frame is shown supported upon a holding pedestal 72 and engaged with the end of a boom 60. For purposes of clarity, with the exception of a single vacuum cup assembly 66 in FIG. 10, the main frame member 68 of FIGS. 10–12 is shown with the various vacuum cup assemblies removed in order to more clearly illustrate the cooperating structure between the clamping frame member 68 and holding pedestal 72.

Each holding pedestal 72 includes a generally vertical post-like support frame member 120 having a suitably shaped table-like platform 122 fixedly mounted at its upper end. Locating pin carrying bases 124, 126 are in turn fixedly mounted upon platform 122, the locking pin carrying base 124 having a fixedly mounted locking pin 128 (FIGS. 11 and 12) fixedly secured to and projecting upwardly from the base, while a second locking pin 130 (FIG. 10) is fixedly mounted upon and projects upwardly from the pin carrying base 126 Pin receiving blocks 132, 134 are fixedly mounted upon one side of main frame member 68 and formed with locating pin receiving bores or vertical passages conformed to slidably receive the locating pins. Preferably, the pins 128 and 130 and their associated pin receiving passages in blocks 132, 134 are of different transverse cross-sections (pin 128 is shown with a triangular cross-section in FIG. 11) to assure proper orientation of frame member 68 relative to the platform so that the tubular pins 90 (FIG. 9) at one end of frame member 68 will face the path of movement of boom 60 for coupling and uncoupling purposes.

The main frame member 68 of a clamping frame assembly may initially be manually loaded upon a holding pedestal 72 simply by lowering the main frame member to seat the locating pins 128, 130 on the holding pedestal within the pin receiving passages in the blocks 132, 134 fixedly mounted upon the main frame member 68 of the clamping frame. As best seen in FIGS. 10 and 12, main frame member 68 is supported from below by the respective bases 124, 126, and the engagement of the locating pins 128, 130 within the vertical passages in blocks 132, 134 holds frame member 68 against horizontal displacement relative to holding pedestal 72 in any direction.

When the main frame member 68 of a clamping frame is mounted upon a holding pedestal 72 as shown in FIGS. 10–12, the boom 60 of a transfer unit may be shifted horizontally toward and away from the right-hand end of frame member 68 as viewed in FIGS. 10 and 11 to engage or disengage the tubular pins 90, 92 on frame member 68 within the pin receiving bores 94, 96 on boom 60. This insertion and removal of the pins 90, 92 into and out of bores 94, 96 requires that the rotary cam locking member 106 be in a release position which accommodates this relative movement of pins 90, 92 relative to the coupling element 98. Holding pedestals 72 are provided with an actuating device designated generally 136 which is operable, when the quick disconnect coupling 62 on boom 60 and frame member 68 are engaged with each other, to rotate the rotary cam member 106 to selectively mechanically lock or unlock the quick disconnect coupling 62. As stated above, the coupling 62 is disclosed in detail in U.S. Pat. Nos. 4,898,287 and 4,905,850 to which reference may be had for further details of the coupling.

Actuating device 136 is a commercially available unit originally developed as a gripper head rotating device. The rotating unit includes a main body or housing 140 which is fixedly mounted upon platform 122. A pair of pneumatic cylinders 142, 144 are mounted upon opposite sides of body 140 and project from the body in longitudinal coaxial alignment with each other. Each of cylinders 142, 144 carries a piston and the facing sides of the pistons are fixedly secured to the opposite ends of an elongate rack (not shown) meshed with a pinion (not shown) which is operatively mounted for rotation about a fixed axis within body 140. Actuation of the pistons to simultaneously drive them in one direction will rotate the pinion within body 140 in one direction, driving of the pistons within the cylinders 142, 144 in the opposite direction will rotate the pinion in the opposite direction.

Referring now to FIGS. 11 and 12, the pinion referred to above is fixedly secured to a mounting member 148 mounted at the exterior of body 140. Mounting member 148 is rotatable relative to body 140 with the above referred-to pinion. An actuator member housing 150 is fixedly mounted on mounting member 148 for rotation with the mounting member and carries an elongate actuating rod 152 which is received within housing 150 for axial sliding movement relative to the housing while being rotatably locked to the housing for rotation with the housing, mounting plate 148 and piston.

At that side of body 140 opposite mounting member 148, the cylinder 154 of a pneumatic motor is fixedly mounted to body 140. A piston (not shown) is operatively mounted within cylinder 154, and a piston rod fixed to this latter piston projects from cylinder 154 through a central bore passing through the pinion within body 140 and the distal end of this piston rod is coupled to actuating member 152 to drive member 152 in axial reciprocation within housing 150 in response to actuation of the piston carried within cylinder 154.

As stated above, such devices are commercially available and well-known in the art. Essentially the actuating device 136 carries actuating rod 152 within housing 140 for axial reciprocation and for rotation about its axis. As best seen in FIG. 12, the distal end of actuating member 152 is forked as at 156, this fork being operable when member 152 is advanced to the right from the position shown in FIG. 12, to rotatively couple actuating member 152 to the rotary cam 106 utilized to lock or unlock the quick disconnect coupling 62 between boom 60 and main frame member 68. Operation of the various pneumatic motors which incorporate the cylinders 142, 144 and 154 is under the control of the master control system of the transfer unit.

Figure 7:
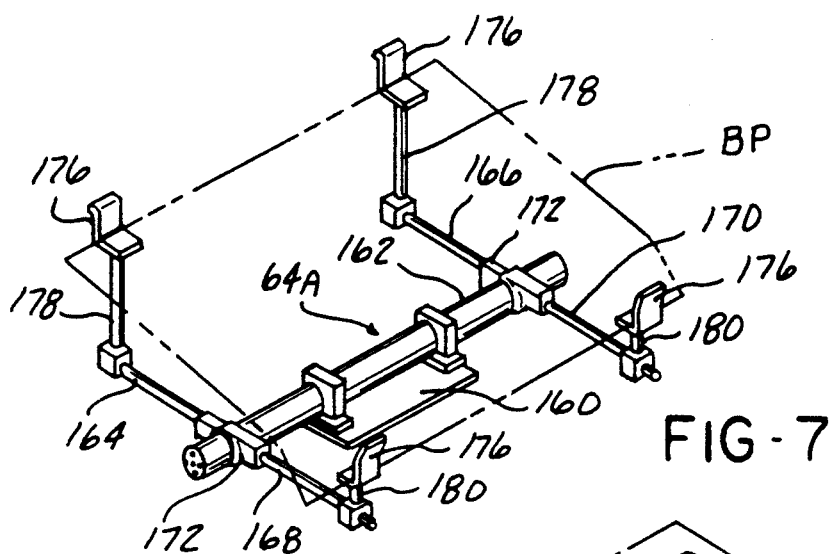
FIG. 7 is a perspective view showing one general type of workpiece receiving nest employed on shuttle conveyors utilized in the present invention.
Figure 8:
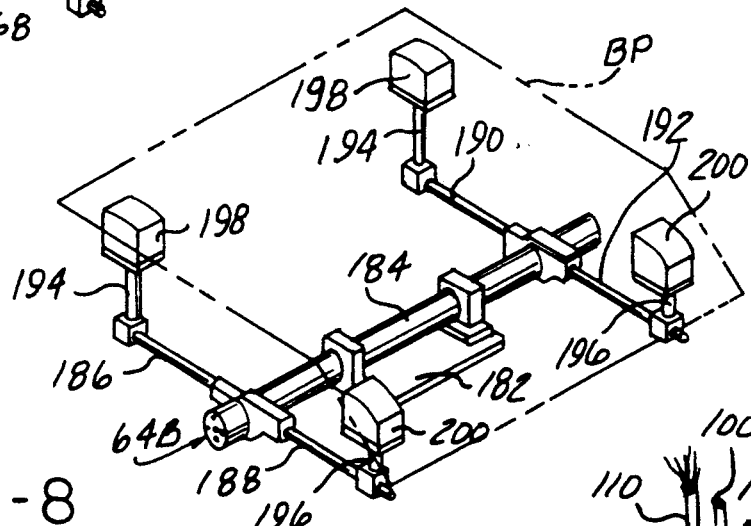
FIG. 8 is a perspective view of an alternative type of workpiece supporting nest.

In FIGS. 7 and 8, two forms of workpiece carrying nests 64A, 64B utilized to support workpieces upon the shuttle carriage 24 of shuttle conveyor 26 are shown. The nests, in use, simply support the workpiece or body panel from beneath while engaging the body panel in some fashion to prevent horizontal displacement of the panel relative to the nest. The panel is retained in position on the nest simply by gravity, hence it is not necessary to utilize releasable clamp or vacuum cups on the nest to retain the workpiece or body panel, thus eliminating the requirement of connecting an air pressure supply line or an electrical power cable to a shuttle carriage which must move along a path of fairly substantial length.

In the past, where the workpieces being handled were automotive body panels, a nest for supporting the panel upon a shuttle carriage typically was constructed by utilizing the underside of a body panel as a mold to form a fiberglass sheet into a surface complementary to the undersurface of the body panel. The formed fiberglass sheet was then attached to a metal mounting bracket having a quick disconnect mechanical coupling device for mounting and dismounting the nest upon the shuttle carriage. While such molded nests provided for accurate positioning of the panel upon the shuttle carriage, where larger panels were involved, the weight of the fiberglass nest became substantial and manual mounting and dismounting the nests upon the shuttle carriage became a two-man job.

In FIGS. 7 and 8, two forms of light-weight nest assemblies are disclosed. The type of nest shown in FIG. 7 will be referred to as an edge gauge nest which, as shown in FIG. 7, is constructed to engage the body panel at various spaced locations along its peripheral edge. The nest 64A is made up of a platform 160 upon which is fixedly mounted a main frame member 162. Branch-like arms such as arms 164, 166, 168 and 170 may be fixedly secured as by brackets 172 to main frame member 162 and edge engaging brackets 176 may be mounted on the various arms as by posts such as 178, 180. Because this arrangement supports the body panel only from spaced locations along its peripheral edge, this type of nest is perhaps best adapted for panels which are relatively inflexible.

In FIG. 8, a contour gauge nest is shown which includes a main platform 182, main frame member 184, arms such as 186, 188, 190, 192 and posts 194, 196, assembled into a relatively light-weight open framework in the same manner as the platform, frame member, arms and posts of the FIG. 7 nest were assembled. In the FIG. 8 arrangement, however, at the upper end of the posts 194, 96, molded pads 198, 200, conformed to localized regions on the underside of the body panel are employed to support the panel upon the nest. Pads 198, 200 typically may be formed of a urethane or fiberglass material. One or more of the pads may be provided with a vertically projecting locating pin (not shown) received within a locating hole in the body panel BP, or the pads may project into a recess in the body panel BP to retain the panel against horizontal shifting movement relative to the nest.

The platforms 160, 182 typically will be provided with a downwardly projecting mounting pin (not shown) receivable in a manually actuated cam locking device, not shown, on the shuttle carriage 24. See U.S. Pat. No. 4,988,261 for a typical quick disconnect coupling for mounting nests of this type upon a shuttle carriage.

The nests 64A, 64B may be mounted and dismounted upon a shuttle carriage 24 manually.

Referring now to FIGS. 1-5, one form of changeover system embodying the present invention is shown in FIGS. 1-3 as including (FIGS. 1 and 3) two alternatively usable shuttle conveyors 26A, 26B, the conveyor 26A being shown in FIGS. 1 and 3 operatively positioned in alignment with the presses P1 and P2 and the transfer devices 20 and 22, which in this particular embodiment are mounted at respective fixed locations. Shuttle conveyors 26A and 26B are mounted on respective platforms 210A, 210B which in turn are mounted for movement along a pair of tracks 212. In addition to supporting a shuttle conveyor, each of the platforms 210A and 210B also fixedly support two holding pedestals 72, the pedestals 72 on each platform being located at one side of the shuttle conveyor adjacent each end of the shuttle conveyor.

Referring now particularly to FIG. 1, the shuttle carriage 24 of conveyor 26A is shown with its nest 64 empty and the shuttle carriage 24 located midway between the ends of the conveyor 26A. A vacuum cup carrying frame 28 is mounted on the boom of transfer device 20 and a second vacuum cup carrying frame 28A is mounted upon the boom of the second transfer device 22. For purposes of explanation, none of the vacuum cup carrying frames 28, 28A or nest 64 is shown supporting a workpiece. As explained above, in an operative cycle upon the opening of press P1, transfer device 20 would shift its vacuum cup carrying frame 28 into the press P1 to grip the panel, lift the panel clear of the press die and convey the panel out of the press. At this time, shuttle carriage 24 would be located at the left-hand end of conveyor 26A as viewed in FIG. 1, and transfer device 20 and the control system would actuate the vacuum cup carrying frame 28 to deposit the panel upon nest 64, release the vacuum cups, and lift frame 28 clear of the deposited panel. Shuttle carriage 24 would then be driven to drive carriage 24 to the right to the right-hand end of shuttle conveyor 26A, at which time the vacuum cup carrying frame 28A at that end would be moved by transfer device 22 into engagement with the panel supported upon nest 64. Transfer device 22 would then cause frame 28A to lift the panel from the nest, advance it horizontally to the right as viewed in FIG. 1 into the open press P2 and to deposit the panel upon the die within press P2. Vacuum cup carrying frame 28A would then be released from the panel and withdrawn from the press. The cycle of operation would be repeated until the line including presses P1 and P2 is changed over to operate on workpieces or body panels of a different configuration.

In preparation for this changeover, a nest 64B would be manually mounted, as shown in FIG. 1, upon the carriage 24B of shuttle conveyor 26B, the nest 64B being conformed to the shape of the workpiece panel which is about to be placed in production. Vacuum cup carrying frames 28B and 28C would be manually loaded upon the holding pedestals 72 mounted on platform 210B. Referring particularly to FIGS. 1 and 3, the first step in accomplishing the actual changeover of the tooling involves the shifting of platform 210A away from the observer as viewed in FIG. 1 until the holding pedestals 72 on platform 210A are operatively aligned with the vertical general plane of movement of the vacuum cup carrying frames 28, 28A at this time respectively mounted upon the booms 60, 60A of transfer units 20 and 22. The booms are then manipulated to deposit their cup carrying frames 28 and 28A upon the respective holding pedestals 72 of platform 210A by vertically lowering the cup carrying frames until the locating pins on the respective pedestals 72 are received within the locating bores or passages on the frames 28-28A as described above. The actuating devices 136 (see FIGS. 10-12) are then actuated to release the cam locks 106 to enable the transfer devices 20, 22 to disconnect their respective booms 60, 60A from the vacuum cup carrying frames 28, 28A by horizontally withdrawing the booms from the frames which are held against horizontal movement by the holding pedestals.

Platform 210A is then moved along tracks 212 further away from the observer in FIG. 1, and platform 210B is advanced along tracks 212 toward the transfer devices 20, 22. Platform 210B is stopped when the vacuum cup carrying frames 28B and 28C on the holding devices 72 on platform 210B are in alignment with the vertical planes of movement of the booms of transfer devices 20 and 22. The transfer devices are then actuated to seat their respective booms in engagement with the vacuum cup carrying frames 28B and 28C, and the actuating devices 136 on the holding pedestals are then actuated to rotate the locking cams 106 to mechanically lock frames 28B and 28C to the booms of transfer units 20 and 22. The transfer units 20 and 22 are then actuated to raise the now-coupled frames 28B and 28C upwardly clear of their respective holding pedestals 72. Platform 210B is then actuated to move forwardly until its shuttle conveyor 26B is operative aligned with transfer devices 20 and 22 and presses P1 and P2.

Figure 4:
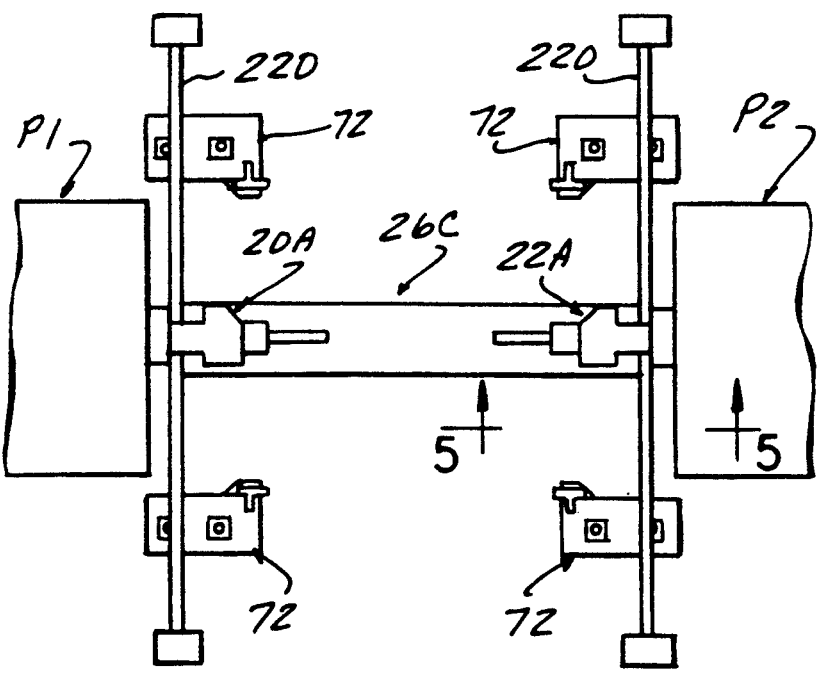
FIG. 4 is a simplified top plan view of an alternative form of the invention.
Figure 5:
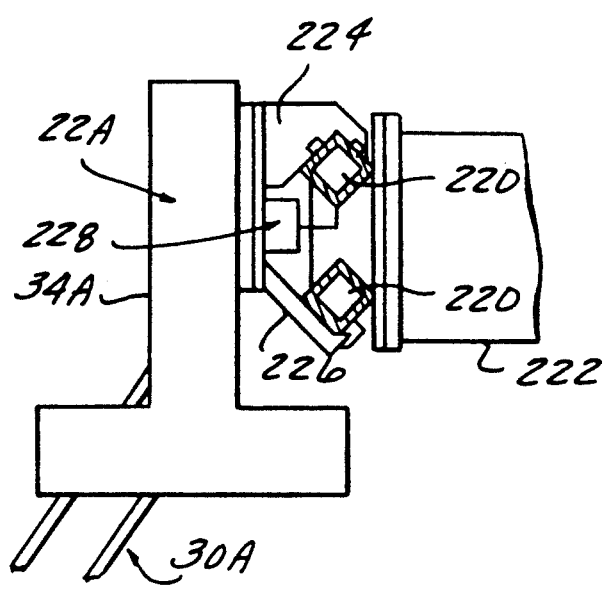
FIG. 5 is a cross-sectional view of a portion of the apparatus in FIG. 4 taken on line 5—5 of FIG. 4.

In FIGS. 4 and 5 an alternative arrangement which employs only a single shuttle conveyor 26C is shown. In the system of FIGS. 4 and 5, four (or more) holding pedestals 72 are employed at locations best seen in FIG. 4. The transfer devices 20A and 22A of the embodiment of FIGS. 4 and 5 are slidably mounted, as best seen in the cross-sectional view of FIG. 5, upon a pair of horizontal tracks 220, fixedly mounted on a suitable fixed frame member 222. The fixed frame 34A of transfer device 22A is formed with a pair of rearwardly projecting arms 224, 226 operatively engaged with rails 220. A suitable drive, schematically indicated at 228 in FIG. 5 is employed to drive the transfer device horizontally along its associated rails 220 as desired. A suitable drive for this purpose is well-known and commercially available, see, for example, U.S. Pat. Nos. 4,193,731 and 4,475,863 for drive arrangements capable of use in the present application.

In the system of FIGS. 4 and 5, the shuttle conveyor 26C and the various holding pedestals 72 are mounted at fixed locations, and the transfer devices 20A, 22A are driven along their respective tracks to unload one set of vacuum cup carrying frames on one pair of holding pedestals 72 and to then shift to pick up another set of vacuum cup carrying frames from the other pair of holding pedestals 72. As in the previously described system, workpiece carrying nests mounted on shuttle conveyor 26C are manually changed as required.

While various embodiments of the invention have been described above, it will be apparent to those skilled in the art the disclosed embodiments may be modified. Therefore, the foregoing description is to be considered exemplary rather than limiting, and the true scope of the invention is that defined in the following claims.

We claim:

1. In a production line adapted to be changed over from production of first workpieces of a first panellike configuration to the production of second workpieces of a second panel-like configuration, said production line including a first and a second work station and workpiece handling means for transferring workpieces from said first work station to said second work station, said workpiece handling means including shuttle conveyor means for conveying a workpiece from a receiving location adjacent said first work station to a discharge location adjacent said second work station, first transfer means for transferring a workpiece from said first work station to said receiving location, and second transfer means for transferring a workpiece from said discharge location to said second work station;

the improvement wherein each of said first transfer means and said second transfer means comprises:

a programmable carrier means;

alternatively usable first and second workpiece gripping means, each respectively adapted to releasably grip and carry a workpiece of said first configuration and a workpiece of said second configuration;

holding means for releasably fixedly holding one of said first and second workpiece gripping means in a ready position in adjacent spaced relationship to one of said first and second work stations and said shuttle conveyor means;

coupling means engageable between said carrier means and said first and second workpiece gripping means for detachably mounting either of said first and second workpiece gripping means on said carrier means, said coupling means including first mating means on said carrier means and second mating means on each of said first and second workpiece gripping means movable into and out of engaged relationship with each other by a predetermined movement of said carrier means relative to one of the first and second workpiece gripping means; and locking means movable with respect to said coupling means, by an actuating means connected to said hold means, between a release position accommodating movement of said first and second mating means into and out of said engaged relationship and a locking position mechanically locking said first and second mating means in said engaged relationship to fixedly mount one of the first and second workpiece gripping means on said carrier means;

said programmable carrier means being operable to move one of the first and second workpiece gripping means mounted thereon along a first path of movement extending between one of the first and second work stations and said shuttle conveyor means and a second path extending from said first path to said ready position.

2. The invention defined in claim 1 wherein each of said first and second workpiece gripping means is adapted to overlie the respective first and second workpieces and to grip the respective workpiece from above, said shuttle conveyor means comprising a shuttle conveyor carriage movable along a path extending between said receiving location and said discharge location, alternatively usable first and second workpiece receiving nests adapted to be detachably mounted upon said shuttle conveyor carriage to respectively support a first or a second workpiece from beneath, one of the first and second workpiece gripping means of said first transfer means being operable to lower a workpiece onto one of the first and second workpiece receiving nests when one of the first and second workpiece receiving nests is at said receiving location and a corresponding one of the first and second workpiece gripping means of said second transfer means being operable to lift a workpiece from one of the first and second workpiece receiving nests when one of the first and second workpiece receiving nests is at said discharge location.

3. The invention defined in claim 2 wherein each of said first and second workpiece gripping means includes power actuated gripping units mounted upon a frame, said first and second mating means respectively including a first power connector means mounted on said carrier means and connected to a power source and a second power connector means mounted on each of said first and second workpiece gripping means and connected to the power actuated gripping units mounted thereon, said first and second connector means connecting said power source to the power actuated gripping units of one of said first and second workpiece gripping means mounted on said carrier means when said first and second mating means are locked in said engaged relationship.

4. The invention defined in claim 3 wherein said power actuated gripping units are pneumatically actuated gripping units and said power source is a source of air under pressure, one of said first and second connector means comprising a tubular pin and the other of said first and second connector means comprising means defining a pin receiving socket adapted to sealingly receive said tubular pin.

5. The invention defined in claim 3 further comprising electrically powered sensing means on each of said first and second workpiece gripping means, and cooperating electrical connector plug means on said carrier means and said first and second workpiece gripping means for establishing an electrical connection between the sensing means on one of said first and second workpiece gripping means and an electrical power source on said carrier means when said one of said first and second workpiece gripping means is fixedly mounted on said carrier means.

6. The invention defined in claim 1 wherein each of said first and second workpiece gripping means comprises a generally horizontal frame member having locating means supported thereon, said holding means including support means engageable with said locating means on said frame member for stably supporting one of the first and second workpiece gripping means on said holding means and restraining one of the first and second workpiece gripping means against horizontal movement relative to said holding means, said first and second mating means being movable into and out of said engaged relationship in response to horizontal movement of said carrier means relative to one of the first and second workpiece gripping means supported on said holding means by said support means.

7. The invention defined in claim 6 wherein said support means comprises support platform means on said holding means and two locating pins fixed to said support platform means and projecting vertically upwardly from spaced locations on said platform means, and said locating means on said frame member is defined by two pin receiving openings in said frame member adapted to slidably receive said locating pins.

8. The invention defined in claim 7 wherein said frame member is a horizontally elongate frame member and said pin receiving openings are in spaced longitudinal alignment on said frame member, said frame member having said second mating means mounted at one end of said frame member, one of said pins and one of said pin receiving openings being of mating complementary cross-sections differing from mating complementary cross-sections of the other of said pins and the other of said openings to establish a single relationship between the second mating means of one of the first and second workpiece gripping means in said ready position and said second path of said carrier means.

9. The invention defined in claim 8 wherein one of said first and second mating means comprises an elongate tubular member axially insertable into an elongate passage constituting the other of said first and second mating means, said locking means comprising a locking member mounted for rotation about an axis transverse to the axis of said passage between said release position wherein said locking member is clear of said passage and said locking position wherein said locking member extends transversely across a portion of said passage, said tubular member having a transverse recess therein adapted to receive said locking member when said first and second mating means are in said engaged relationship and said locking member is in said locking position.

10. The invention defined in claim 9 wherein said actuating means comprises powered drive means on said holding means movable into and out of engagement with said locking member and operable when engaged with said locking member to drive said locking member in rotation between said release position and said locking position.

11. The invention defined in claim 10 wherein said locking member is mounted on said carrier means.

12. The invention defined in claim 1 wherein said workpiece handling means are operable to transfer a workpiece from said first work station to said second work station along a transfer path which lies within a generally vertical plane, said holding means being located to hold one of said first and second workpiece gripping means in said ready position at a location clear of said transfer path, said carrier means and said holding means being movable relative to each other along a changeover path extending transversely of said transfer path.

13. The invention defined in claim 12 wherein each of said first and second transfer means includes a fixedly mounted main frame and means mounting said carrier means on said main frame for movement within said generally vertical plane, said shuttle conveyor means comprising a first elongate shuttle conveyor mounted on a first platform and a second elongate shuttle conveyor mounted on a second platform, power means for moving said first and second platforms along the changeover path normal to said generally vertical plane and the longitudinal axes of said first and second elongate shuttle conveyors to selectively locate the longitudinal axis of one of said first and second elongate shuttle conveyors in said generally vertical plane.

14. The invention defined in claim 12 wherein said shuttle conveyor means comprises an elongate shuttle conveyor having a longitudinal axis lying in said generally vertical plane, said holding means comprises first and second holding means mounted at fixed locations offset from said generally vertical plane adjacent said receiving location and third and fourth holding means mounted at fixed locations offset from said generally vertical plane adjacent said discharge location, ad the invention further comprises shifting means for independently shifting said first and said second transfer means along respective transfer means paths normal to said generally vertical plane to selectively align the carrier means of said first transfer means with said first or said second holding means or with said generally vertical plane and to selectively align the carrier means of said second transfer means with said third or said fourth holding means or with said generally vertical plane.

* * * * *

UNITED STATES PATENT AND TRADEMARK OFFICE
CERTIFICATE OF CORRECTION

PATENT NO. : 5,222,854
DATED : June 29, 1993
INVENTOR(S) : Leland D. Blatt and David J. Crorey It is certified that error appears in the above-identified patent and that said Letters Patent is hereby corrected as shown below:

Column 11, line 36, please delete "96" and insert

--196--.

Signed and Sealed this

Tenth Day of May, 1994

BRUCE LEHMAN

Attest:

Attesting Officer

Commissioner of Patents and Trademarks